United States Patent [19]

Asal

[11] 3,773,115

[45] Nov. 20, 1973

[54] IMPLEMENT MOUNTING AND ACTUATING MECHANISM

[75] Inventor: Jerrold R. Asal, Joliet, Ill.

[73] Assignee: Caterpillar Tractor Co., Peoria, Ill.

[22] Filed: Mar. 6, 1972

[21] Appl. No.: 231,998

[52] U.S. Cl ................. 172/803, 172/809, 37/117.5
[51] Int. Cl................................................ E02f 3/76
[58] Field of Search............ 172/804, 801, 803-807, 172/809; 37/117.5, 42

[56] References Cited
UNITED STATES PATENTS

| | | | |
|---|---|---|---|
| 1,989,431 | 1/1935 | Stamm | 172/809 |
| 2,446,136 | 7/1948 | Jarmin | 172/809 |
| 3,435,908 | 4/1969 | Sunderlin et al. | 172/801 X |
| 3,456,369 | 7/1969 | Leposky | 37/42 R |
| 3,296,721 | 1/1967 | Coontz | 172/801 |

Primary Examiner—Robert E. Pulfrey
Assistant Examiner—Stephen C. Pellegrino
Attorney—Warren J. Krauss

[57] ABSTRACT

An implement mounting and actuating mechanism for vehicles which have a main body with ground-engaging traction members disposed on either side thereof in spaced relation thereto and which have an implement disposed adjacent one end thereof. A mounting frame which supports the implement has support arms which extend along each side of the vehicle for pivotal connection thereto. Powered actuators for the implement are disposed and pivotally supported on the main body intermediate the opposite ends of the vehicle. Force-transmitting linkage is mounted on a portion of the main body at a point vertically below the pivotal support for the powered actuators which linkage interconnects the powered actuators and the implement for selective elevational movement of the implement.

9 Claims, 4 Drawing Figures

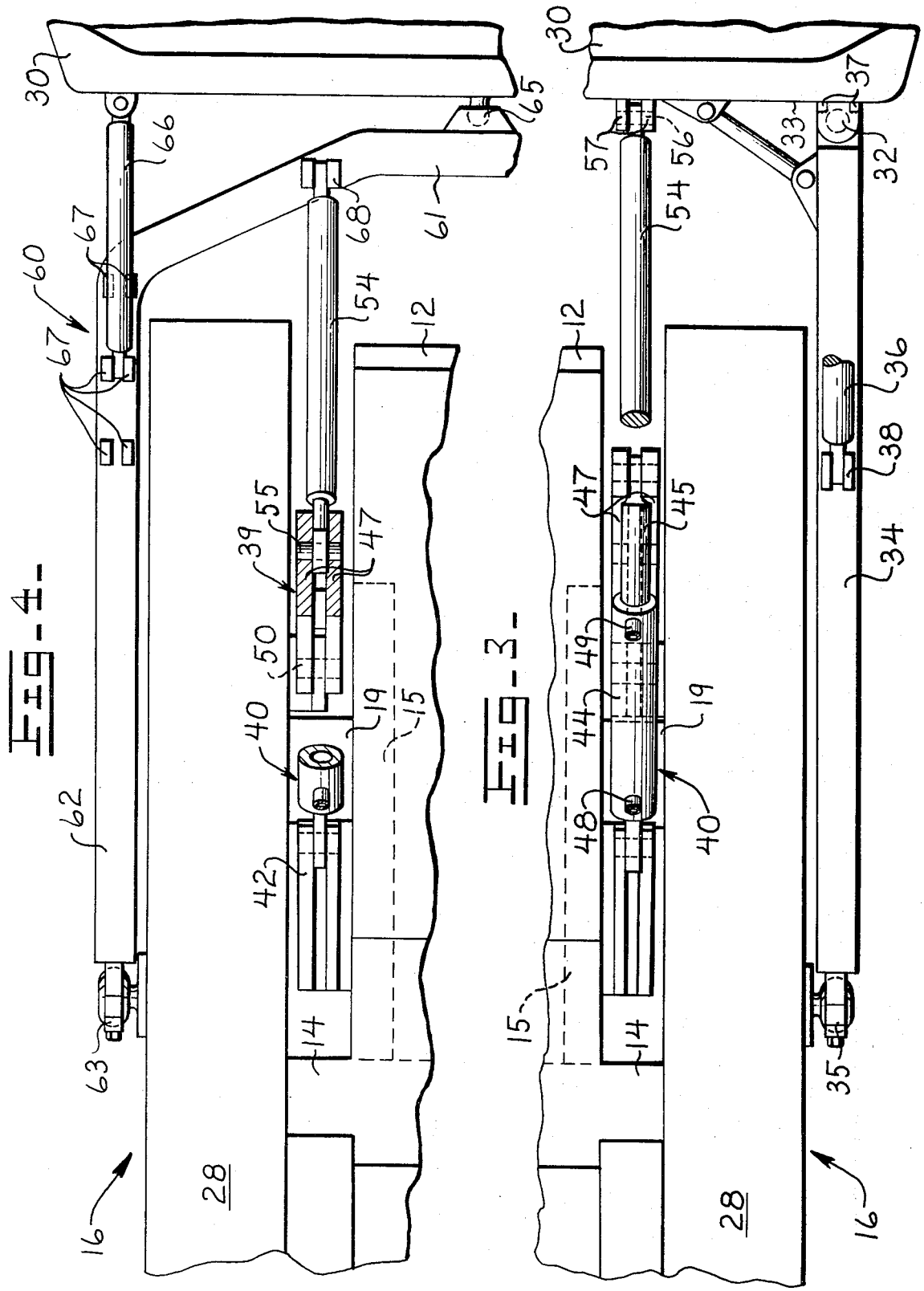

IMPLEMENT MOUNTING AND ACTUATING MECHANISM

BACKGROUND OF THE INVENTION

This invention relates to a mounting and actuating mechanism for an implement which is pivotally supported on a vehicle for powered elevational movement relative to the vehicle. The pivotal mounting of an earth-moving implement upon a vehicle in such a manner as to provide a desired high range of elevation movement while still achieving an efficient transfer of actuating and operating loads to the vehicle frame has heretofore been a problem. Many attempts have been made to fulfill these seemingly contradictory requirements. This is evidenced by the existence of innumerable patents directed to implement mounting and actuating arrangements, any of which is, at best, a compromise.

One type of such prior art systems is disclosed by the U.S. patent to Long, No. 3,386,519 and by U.S. Pat. No. 2,973,592 to Abel. In these patented arrangements, a bulldozer blade is supported by a mounting frame which is pivoted upon a vehicle with an extensible and retractable hydraulic jack connected between the implement and a pivotal support connection adjacent the forward end of the vehicle. The load-supporting connection between the hydraulic jack and the vehicle is disposed forwardly on the vehicle frame adjacent to the engine cooling radiator. In vehicles having this type of mounting arrangement, the forward portion of the vehicle frame is cantilevered from the rear portion without any load-supporting connection between the frame and the track assembly for transfer of loads to the ground. The substantially large forces required for actuation of the implement in earthmoving operations, such as prying stones or stumps from the ground, require massive vehicle frames and support structures to avoid excessive deflection which could result in damage to the frame or radiator due to excessive flexing during operation of the implement.

Further representations of the prior art are found in the Carnes U.S. Pat. No. 2,674,818 and the patent to Troop, U.S. Pat. No. 2,681,518 wherein the actuating mechanisms are supported generally laterally aligned with and vertically above the vehicle track assembly. These arrangements obviously require massive support frames or towers mounted either on the vehicle main frame, as shown by Troop, or on the track assembly frame, as disclosed by Carnes.

These mounting structures add considerable weight and cost to the vehicle and in many cases also obstruct access to the operator compartment of the vehicle. Support structures of the type shown in Carnes which have support means disposed outwardly of the track assembly are also subject to damage, due to the extremely rugged nature of the work performed by implements such as bulldozer blades. For example, operation of the vehicle along a high wall or adjacent to trees can damage or destroy the outer portions of the mounting towers of the implement actuating mechanism.

U.S. Pat. No. 3,325,924, to Peck, Jr., teaches another prior art system which provides a loader lift linkage adapted to control elevational movement of a bulldozer blade. The lift linkage is pivotally supported upon the vehicle at a point substantially above the vehicle main frame. This approach, like that of Carnes, requires a massive structural support tower for the transfer of loads from the actuating linkage to the vehicle main frame. The actuator or jack extends from the linkage downwardly to its point of connection on the vehicle framework which is between the track assembly and the vehicle body. In this location, the jack is susceptible to damage from rocks and mud which are carried by the track during operation of the vehicle.

Such prior art implement mounting and actuating systems generally require additional heavy and costly support structures, introduce potentially damaging stress concentrations into normally non-supportive portions of the vehicle, and expose the elements of the actuating mechanism to the risk of severe structural damage.

OBJECTS OF THE INVENTION

It is an object of this invention to provide an improved implement mounting and actuating arrangement for an earthmoving vehicle in which the actuating mechanism is adequately protected from inadvertent damage.

Another object of this invention is to provide an improved implement mounting and actuating mechanism for a vehicle wherein the actuating mechanism is located laterally inwardly of the vehicle traction means and is connected in direct-load transfer relation to the vehicle frame.

Still another object of the invention is to provide an improved, efficient, versatile implement mounting and actuating mechanism for an earthmoving vehicle wherein implements having different mounting configurations can readily be mounted upon the vehicle in direct load transfer relation to the vehicle structural frame members without major modifications and in a relatively inexpensive manner without intolerable weight increases.

Other objects and advantages of the present invention will become more readily apparent upon reference to the accompanying drawings and following description.

BRIEF DESCRIPTION OF THE DRAWINGS

FIG. 3 is a fragmentary plan view, partially in section, of the implement mounting and actuating mechanism of the preceding figures;

FIG. 4 is a fragmentary plan view illustrating an alternate embodiment of the present invention.

DETAILED DESCRIPTION

Figure 1:
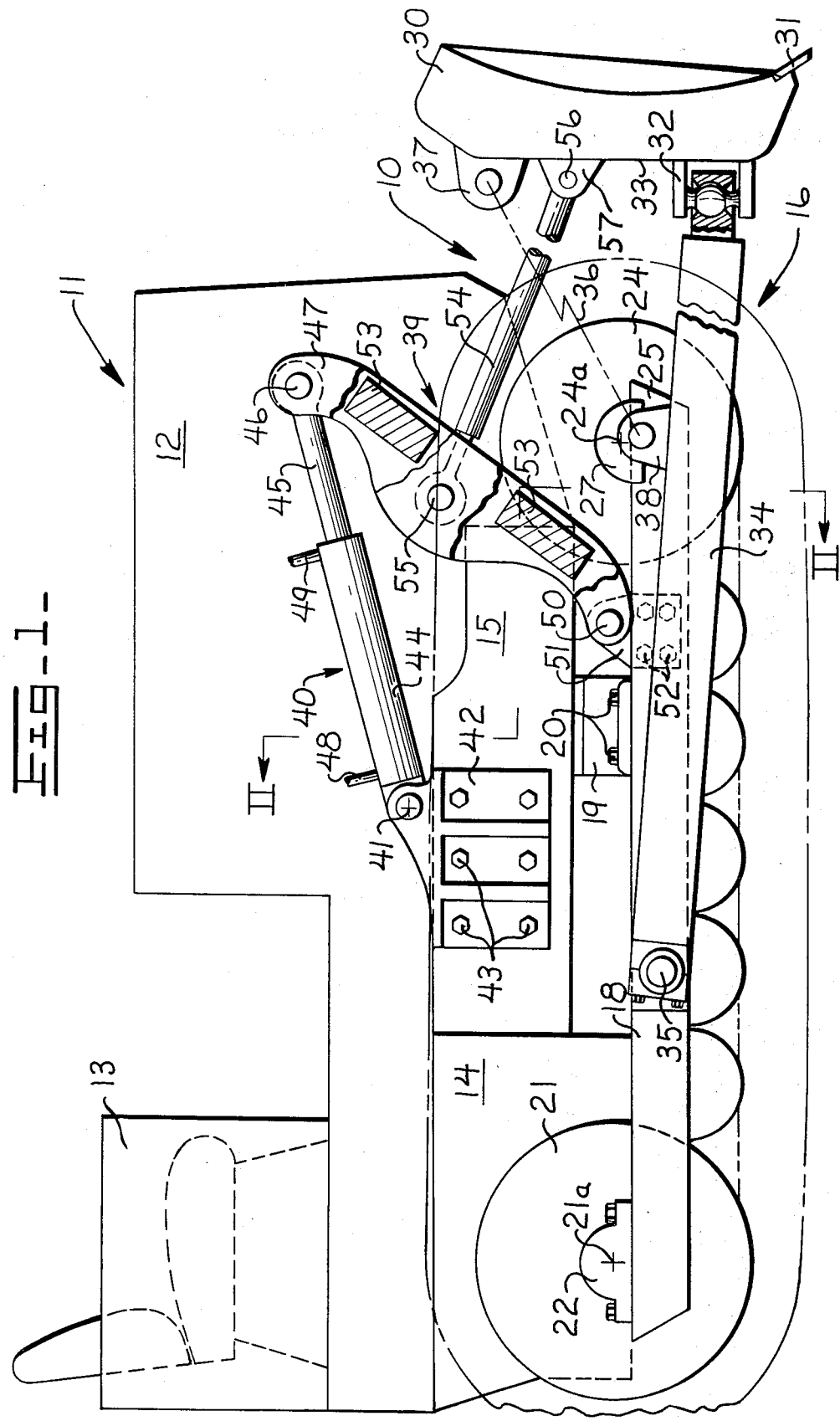
FIG. 1 is a side elevation of an implement mounting and actuating mechanism embodying the principles of the present invention operationally supported upon a vehicle.

Referring more particularly to the drawings, an implement mounting and actuating mechanism embodying the principles of the present invention is generally indicated by the reference numeral 10 in operative association with a track-type vehicle generally designated by the reference numeral 11. Vehicle 11 includes an elongated body 12 having an operator station 13 disposed at the rear end portion thereof. The body also includes a gear case 14 mounted below the operator station and a vehicle main frame 15 projecting forwardly therefrom in cantilevered fashion.

A pair of driven track assemblies 16, one of which is shown in FIG. 3, are disposed in laterally extending, generally parallel relation to the main frame at opposite sides of the body portion 12. The track assemblies are each spaced outwardly from the body along approximately two-thirds of the forward portion of the vehicle. The assemblies each include an elongated track frame 18 which has suitable supporting connections with the case portion 14. The track frame is also connected to the vehicle by means of a cross member 19 which extends transversely across the vehicle and is connected, by means of capscrews 20 or other suitable means, to the track frame 18 to extend upwardly therefrom in load-supporting relationship. The cross member 19 is rigidly secured to the main frame 15. In this manner, the frames are securely fixed in supporting relation to the vehicle body 12.

Each track assembly has a track driving sprocket 21 supported for rotation about a transverse axis 21a by means of a bearing member 22 on an upper rearward surface of the frame 18. The sprocket has driving connection with a prime mover (not shown) which may be conveniently located within body 12. An idler wheel 24 is supported for rotation about a second transverse axis 24a adjacent the forward end 25 of frame 18 by a bearing member 27 which is longitudinally adjustably supported upon an upper surface of the frame. An endless track chain or belt 28 is mounted in driving relation around the sprocket 21 and idler wheel 24 for propelling the vehicle over the ground in the usual manner.

A bulldozer blade 30 is disposed transversely across the forward end of the vehicle and is spaced outwardly therefrom. The blade has a cutting edge 31 secured to its lower forward edge for engagement with the ground or other material upon movement of the vehicle. The blade further includes a pair of ball-type brackets 32 which are secured to a rear surface 33 thereof adjacent each blade for pivotal connection to the forward ends of a pair of blade mounting push arms 34. The push arms extend rearwardly from their pivotal connection to the blade along each side of the vehicle laterally outwardly of track assemblies 16. Each arm is pivotally connected to a portion of its respective track frame 18 by means of a ball joint 35 which extends outwardly from the frame. In the preferred embodiment, the arms are disposed forwardly of the rotational axis 21a of the sprocket wheel 21 by approximating one-third of the total longitudinal distance between the axes 21a and 24a.

As shown in FIGS. 1 and 3, the blade 30 is supported in a substantially vertical attitude by an angularly-disposed brace member 36 which is pivotally connected at one end to a bracket 37 on the back of the blade and at its opposite end to a bracket 38 which is secured to the push arm 34.

In order to change the elevation of the blade 30 from an earth-engaging lower position and an upper pushing or travel position, a pair of powered actuators or lifting mechanisms, generally designated by the reference numeral 39, are disposed on opposite sides of body 12. Since the actuators are identical, only one will be described. As illustrated, an extensible hydraulic jack 40 is pivotally supported at 41 upon a forwardly-extending portion of the main frame 15 by means of a suitable bracket member 42 which is secured in direct load transferring relation to the frame 15 by a plurality of capscrews 43 or other suitable means, such as welding.

The bracket member 42 is disposed between the sprocket and idler wheels. The pivotal connection of the jack 40 to its mounting bracket is disposed laterally inwardly of and slightly above the track assembly 16. Jack 40 has a cylinder 44 and an extensible rod 45 the outer end of which is pivotally connected at 46 to the upper end of a lever 47 substantially upwardly from the track assembly 16. The inner end of rod 45 is secured to a piston (not shown) which is sealingly and movably supported within the cylinder 44 in the usual manner. Introduction of pressurized fluid through a conduit 48 to the closed chamber formed by the head or closed end of the cylinder 44 is effective to extend the rod 45. Pressurizing the rod end of the cylinder through a conduit 49 retracts the rod.

As shown, the location of the pivotal connections of jack 40 to the frame 15 and to the lever 47 disposes the entire jack assemblage laterally inwardly of and above the track assembly to prevent damage due to rocks, mud or other debris which might jam between the track chain 28 and the body 12. Location of the jack inwardly of the track assembly also protects it and its mounting bracket from damage caused by operating the implement in proximity to a high wall or adjacent to trees or other obstructions.

Lever 47 extends downwardly between the body 12 and the track assembly 16 from its pivotal connection with the jack rod 45 to a lower end which is pivotally connected, at 50, to a bracket 51 which is secured in direct load transferring relation to the track frame 18 by means of a plurality of capscrews 52. In an alternate arrangement, the bracket 51 could be secured to the cross member 19 which member, as discussed above, is connected to the track frame 18.

The pivot connection 50 is disposed below and longitudinally forwardly spaced from pivot 41 to achieve an advantageous distribution of implement actuating and operating forces to the main frame 15 and the track frame 18. The pivot connection 50 is also disposed in substantial alignment with a horizontal plane which extends through the sprocket and idler wheel rotational axes 21a and 24a. Such pivot placement provides good mechanical advantage in the lift linkage and also reduces the application of bending forces to the lever 47 by directing longitudinal forces to the frame 18 through the pivot connection 50.

Figure 2:
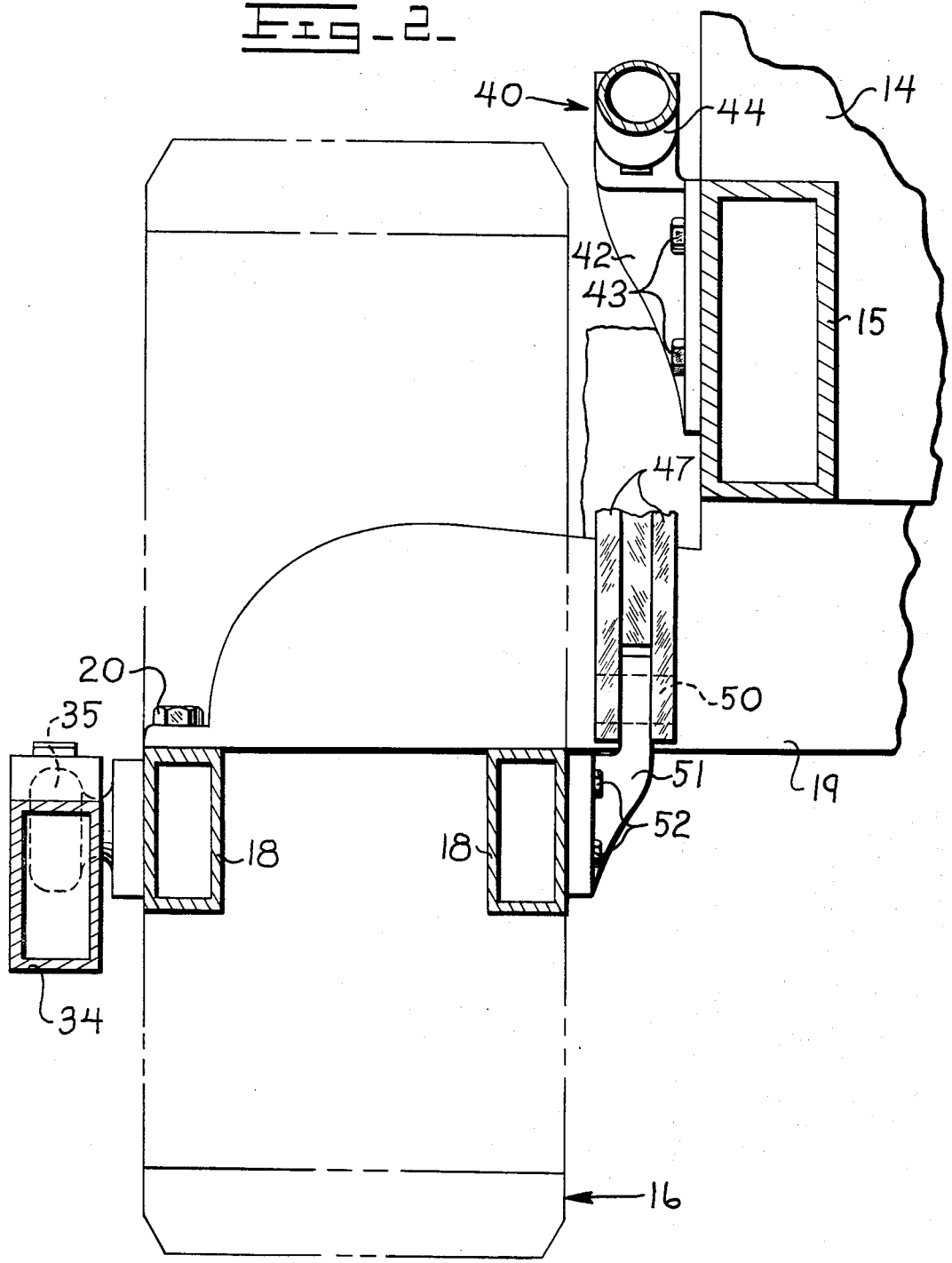
FIG. 2 is a partial transverse vertical sectional view taken generally along the line II—II of FIG. 1.

As best shown in FIG. 2, the lever 47 is formed from a pair of spaced plate members having suitable spacer blocks 53 secured therebetween. A link 54, having one end pivotally connected at 55 approximately intermediate the ends of the lever 47, extends forwardly and downwardly therefrom to the pivotal connection at 56 of this other end to the blade 30 by means of a bracket 57 secured thereto.

In FIG. 4, an alternate embodiment, having an angling blade, is presented. In this embodiment, the mounting for blade 30 includes a C-frame 60 which has a transversely extending, forwardly disposed central portion 61 and rearwardly extending leg portions, one of which is shown at 62, pivotally connected to the frame 18 by means of a ball and socket connection 63. The blade 30 is pivotally supported at approximately the lateral center line of the vehicle by means of a universal connection 65 on the transverse portion 61 of the C-frame. The blade is further supported by angling braces 66 which are pivotally connected between the outer transverse end portion of blade 30 and one of a plurality of brackets 67 secured to the legs 62. Selective connection of braces 66 to different ones of brackets 67 disposes blade 30 in selected transverse angular relation to the longitudinal center of the vehicle. The implement actuating mechanism 39 is adaptable to the angling blade embodiment by pivotal connection of link 54 to a bracket 68 secured to the transverse portion 61 of C-frame 60 instead of utilizing a direct connection of the link to the blade, as in the embodiment of FIG. 1.

The operation of the present invention will now be described.

When it is desired to lower the blade 30 to an operative ground-engaging position, jack 40 is extended, by introduction of fluid pressure to the head end thereof through conduit 48, as previously described. Extension of the jack 40 causes the rotation of lever 47 in a clockwise direction about its pivotal connection 50. This rotation causes the application of a force forwardly and downwardly upon link 54 to cause the lowering of blade 30 toward the ground as push arms 34 swing about their pivotal connections 35. The force required to push the cutting edge 31 into the ground is transferred directly to the main frame 15 and track frame 18, in the previously-described manner.

Retraction of the jack 40 causes the rotation of lever 47 in a counterclockwise direction around its pivot 50. This movement pulls link 54 rearwardly and upwardly to raise the blade 30 relative to the ground while swinging the arms 34 about their pivotal connections 35 to the frames 18. Again, the force required to raise the blade is transferred directly to frames 15 and 18.

The versatility of the subject mounting structure is demonstrated by the fact that the brackets 42 and 51 are located so as to permit the mounting of other types of implement supports without modification or additional mounting brackets. For example, removal of the blade 30, push arms 34, links 54, and lever 47 would permit the installation of an inside arm dozer; that is, one having its push arms disposed between the body of the vehicle and the track assemblies. In such a system, the push arms would be directly pivoted by means of the bracket 51 to the track frames 18. Such structure would usually include an upstanding arm rigidly secured to each of the push arms which would be pivotally connected to the jack rod 45 to permit elevational movement of the blade.

In view of the foregoing, it is readily apparent that the structure of the present invention provides an improved implement mounting and actuating mechanism of minimum weight and cost which efficiently transfers the implement actuating and operating forces to the vehicle structural frame members and which locates the elements of the mechanism protectively to avoid damage thereto.

While the invention has been described and shown with particular reference to the preferred embodiment, it will be apparent that variations and modifications are possible within the spirit of the inventive concepts and that no limitation is intended, except by the scope of the appended claims.

What is claimed is:

1. In a vehicle having an elongated main body with opposite ends and ground-engaging traction means disposed at each side of said main body in outwardly-spaced relation thereto, an implement mounting and actuating mechanism comprising; implement means disposed adjacent to one end of said vehicle, mounting frame means disposed in supporting relation to and connected to said implement means and including support arm means extending along each side of said vehicle and pivotally connected thereto, actuation means disposed upon said vehicle inwardly of said traction means, support means for mounting said actuation means on said vehicle between the opposite ends of said vehicle, and force-transmitting linkage means disposed inwardly of said traction means and operatively interconnecting said actuation means and said implement means for elevational movement of said implement means relative to said vehicle, said force-transmitting linkage means being pivotally connected to said vehicle at a point which is elevationally beneath said support means for said actuation means pivotal mounting means for pivotally connecting said force-transmitting linkage means to said vehicle in longitudinally-spaced relation to said support means for said actuation means, said elongated main body including a substantially horizontally-disposed frame means including cross member means and said support means is secured in direct force-transmitting relation to said horizontally-disposed frame means, wherein said traction means include a track mechanism mounted upon elongated frame means which elongated frame means are secured to said horizontally-disposed frame means and wherein said pivotal mounting means are secured in direct force-transmitting relation to said cross member means.

2. The invention of claim 1 wherein said support means for said actuation means are disposed on said main body elevationally above and laterally inwardly of said traction means.

3. The invention of claim 1 in which said actuation means includes an extensible fluid motor having a first portion connected to said support means and another portion connected to said force-transmitting linkage means.

4. In a vehicle having an elongated main body with opposite ends and ground-engaging traction means disposed at each side of said main body in outwardly-spaced relation thereto, an implement mounting and actuating mechanism comprising; implement means disposed adjacent to one end of said vehicle, mounting frame means disposed in supporting relation to and connected to said implement means and including support arm means extending along each side of said vehicle and pivotally connected thereto, actuation means disposed upon said vehicle inwardly of said traction means, support means for mounting said actuation means on said vehicle between the opposite ends of said vehicle, and force-transmitting linkage means disposed inwardly of said traction means and operatively interconnecting said actuation means and said implement means for elevational movement of said implement means relative to said vehicle, said force transmitting linkage means being pivotally connected to said vehicle at a point which is elevationally beneath said support means for said actuation means, said actuation means including an extensible fluid motor having a first portion connected to said support means and another portion connected to said force-transmitting linkage means, pivotal mounting means for pivotally connecting said force-transmitting linkage means to said vehicle, said force-transmitting linkage means comprising; lever means disposed in substantially upstanding relation to said vehicle and having an upper end portion pivotally connected to said other portion of said fluid motor and having a lower end portion pivotally connected to said pivotal mounting means, and a link member having an end pivotally connected to said lever means between said upper and lower end portions and having an opposite end connected to said implement means.

5. The invention of claim 4 in which said support means for said fluid motor is disposed elevationally above and laterally inwardly of said traction means, and wherein said pivotal mounting means are disposed in longitudinally-spaced relation to said support means.

6. The invention of claim 5 in which said traction means include a pair of track assemblies, each assembly comprising; an elongated frame means, a driving sprocket support means on said frame means adjacent one end thereof for rotation of said sprocket about a first transverse axis, an idler wheel supported adjacent the other end of said elongated frame means for rotation about a second transverse axis and longitudinally spaced apart from said first transverse axis, said pivotal mounting means being secured to said elongated frame means between the ends thereof for pivotal movement of said lever about an axis substantially parallel to said second transverse axis.

7. The invention of claim 6 wherein said implement means is a bulldozer blade disposed forwardly of said vehicle, said mounting frame means including a pair of push arms individually connected in supporting relation to said bulldozer blade adjacent opposite side edges thereof and each push arm extending rearwardly for pivotal connection to its respective elongated frame means, and said opposite end of said link member connected directly to a portion of said bulldozer blade.

8. The invention of claim 6 in which said implement means is a bulldozer blade disposed forwardly of said vehicle, said mounting frame means including a C-frame means having a transverse portion disposed forwardly of said vehicle for supporting connection with said bulldozer blade and a pair of laterally-spaced, substantially parallel, longitudinally-extending leg portions, each leg portion extending rearwardly in laterally outwardly-spaced relation to one of said track assemblies for pivotal connection to its respective elongated frame means, said opposite end of said link member being connected to said transverse portion of said C-frame means.

9. The invention of claim 7 in which said elongated main body includes a substantially horizontally-disposed frame member means and in which said support means is secured in direct force-transmitting relation to said frame member means, wherein said pivotal mounting means for said force-transmitting linkage means is secured, in direct force-transmitting relation, to said elongated frame means.

* * * * *